US009550464B2

(12) United States Patent
Revankar et al.

(10) Patent No.: US 9,550,464 B2
(45) Date of Patent: Jan. 24, 2017

(54) ACTIVE KNEE PROTECTION SYSTEM

(71) Applicant: TK Holdings Inc., Auburn Hills, MI (US)

(72) Inventors: Vidyakant C. Revankar, Rochester Hills, MI (US); Larry M. Wilmot, Oxford, MI (US); Jay Z. Zhao, West Bloomfield, MI (US); Ning Zhang, Rochester Hills, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 14/586,877

(22) Filed: Dec. 30, 2014

(65) Prior Publication Data

US 2015/0183395 A1 Jul. 2, 2015

Related U.S. Application Data

(63) Continuation-in-part of application No. 14/557,385, filed on Dec. 1, 2014.

(60) Provisional application No. 61/922,077, filed on Dec. 30, 2013.

(51) Int. Cl.
*B60R 21/0134* (2006.01)
*B60R 19/40* (2006.01)
*B60R 21/34* (2011.01)

(52) U.S. Cl.
CPC .......... *B60R 21/0134* (2013.01); *B60R 19/40* (2013.01); *B60R 21/34* (2013.01)

(58) Field of Classification Search
CPC ............. B60R 21/36; B60R 2021/0051; B60R 2021/0083;B60R 2021/346; B60R 2021/0053; B60R 19/56; B60R 21/34; B60R 19/40; B60R 19/12
See application file for complete search history.

(56) References Cited

U.S. PATENT DOCUMENTS

| 3,236,552 | A | | 2/1966 | Percifull | |
|---|---|---|---|---|---|
| 3,525,535 | A | * | 8/1970 | Yasusaburo | B60R 21/06 280/749 |
| 3,656,791 | A | * | 4/1972 | Truesdell | 293/107 |
| 3,779,325 | A | * | 12/1973 | Liuhanen | A63C 13/00 180/313 |
| 4,176,858 | A | * | 12/1979 | Kornhauser | 280/734 |

(Continued)

FOREIGN PATENT DOCUMENTS

| EP | 1619089 B1 | 7/2005 |
|---|---|---|
| EP | 1800960 B1 | 12/2006 |

(Continued)

OTHER PUBLICATIONS

Office Action issued in related U.S. Appl. No. 14/588,283, dated Feb. 11, 2016.

(Continued)

*Primary Examiner* — Darlene P Condra
(74) *Attorney, Agent, or Firm* — Meunier Carlin & Curfman LLC

(57) ABSTRACT

An active leg engagement system for a vehicle includes a selectively deployable leg-engaging member containing an airbag or expandable energy absorber for protecting a pedestrian from collision with the vehicle. An alternative embodiment may include an expandable energy absorber within or behind a vehicle bumper.

23 Claims, 8 Drawing Sheets

(56) References Cited

U.S. PATENT DOCUMENTS

| | | | |
|---|---|---|---|
| 5,106,137 A * | 4/1992 | Curtis | 293/107 |
| 5,725,265 A * | 3/1998 | Baber | 293/107 |
| 5,810,427 A * | 9/1998 | Hartmann et al. | 296/187.03 |
| 6,089,628 A | 7/2000 | Schuster | |
| 6,106,038 A * | 8/2000 | Dreher | B60R 19/205 293/107 |
| 6,276,483 B1 * | 8/2001 | Sinnhuber | B60R 21/00 180/271 |
| 6,293,362 B1 | 9/2001 | Sasaki et al. | |
| 6,334,639 B1 * | 1/2002 | Vives et al. | 293/133 |
| 6,394,512 B1 * | 5/2002 | Schuster et al. | 293/15 |
| 6,415,883 B1 | 7/2002 | Myrholt et al. | |
| 6,612,608 B2 * | 9/2003 | Schmidt | B60R 21/2165 280/728.3 |
| 6,637,536 B1 | 10/2003 | Polz et al. | |
| 6,637,788 B1 * | 10/2003 | Zollner et al. | 293/107 |
| 6,701,569 B1 | 3/2004 | Benner | |
| 6,726,260 B1 | 4/2004 | Wang et al. | |
| 6,834,899 B2 * | 12/2004 | Lindsey | 293/118 |
| 6,923,483 B2 * | 8/2005 | Curry et al. | 293/107 |
| 7,413,049 B2 | 8/2008 | Schramm et al. | |
| 7,699,383 B2 | 4/2010 | Fukukawa et al. | |
| 7,703,819 B2 | 4/2010 | Finney | |
| 7,757,804 B1 * | 7/2010 | Li | B60R 21/34 180/274 |
| 7,881,843 B2 * | 2/2011 | Murakami et al. | 701/45 |
| 7,997,375 B2 | 8/2011 | Shaw | |
| 8,141,918 B2 * | 3/2012 | Miller et al. | 293/143 |
| 8,950,800 B1 | 2/2015 | Farooq et al. | |
| 9,033,092 B1 | 5/2015 | Farooq et al. | |
| 2001/0030431 A1 | 10/2001 | Killday | |
| 2004/0160071 A1 * | 8/2004 | Suganuma et al. | 293/132 |
| 2004/0189024 A1 | 9/2004 | Lindsey | |
| 2005/0017519 A1 | 1/2005 | Regnell et al. | |
| 2007/0125589 A1 | 6/2007 | Murphy et al. | |
| 2008/0097699 A1 | 4/2008 | Ono | |
| 2009/0152880 A1 | 6/2009 | Donovan | |
| 2009/0242308 A1 | 10/2009 | Kitte et al. | |
| 2009/0289471 A1 | 11/2009 | Finney et al. | |
| 2010/0156080 A1 * | 6/2010 | Napier | B60D 1/00 280/762 |
| 2013/0119681 A1 * | 5/2013 | Mendis et al. | 293/107 |
| 2015/0151700 A1 | 6/2015 | Revankar et al. | |
| 2015/0203067 A1 | 7/2015 | Revankar et al. | |
| 2015/0224956 A1 | 8/2015 | Takenaka | |
| 2015/0283967 A1 | 10/2015 | Cuddihy et al. | |

FOREIGN PATENT DOCUMENTS

| | | |
|---|---|---|
| EP | 1867525 B1 | 2/2007 |
| EP | 2189335 A1 | 2/2007 |
| EP | 2189335 B1 | 2/2007 |
| EP | 1867526 B1 | 6/2007 |
| EP | 1986895 B1 | 11/2015 |
| GB | 2384215 A | 7/2003 |
| JP | 2013001386 A * | 1/2013 |
| WO | 2005009806 A1 | 2/2005 |

OTHER PUBLICATIONS

Office Action issued in related U.S. Appl. No. 14/588,283, dated May 25, 2016.

Office Action issued in related U.S. Appl. No. 14/557,385 dated Jun. 22, 2015.

\* cited by examiner

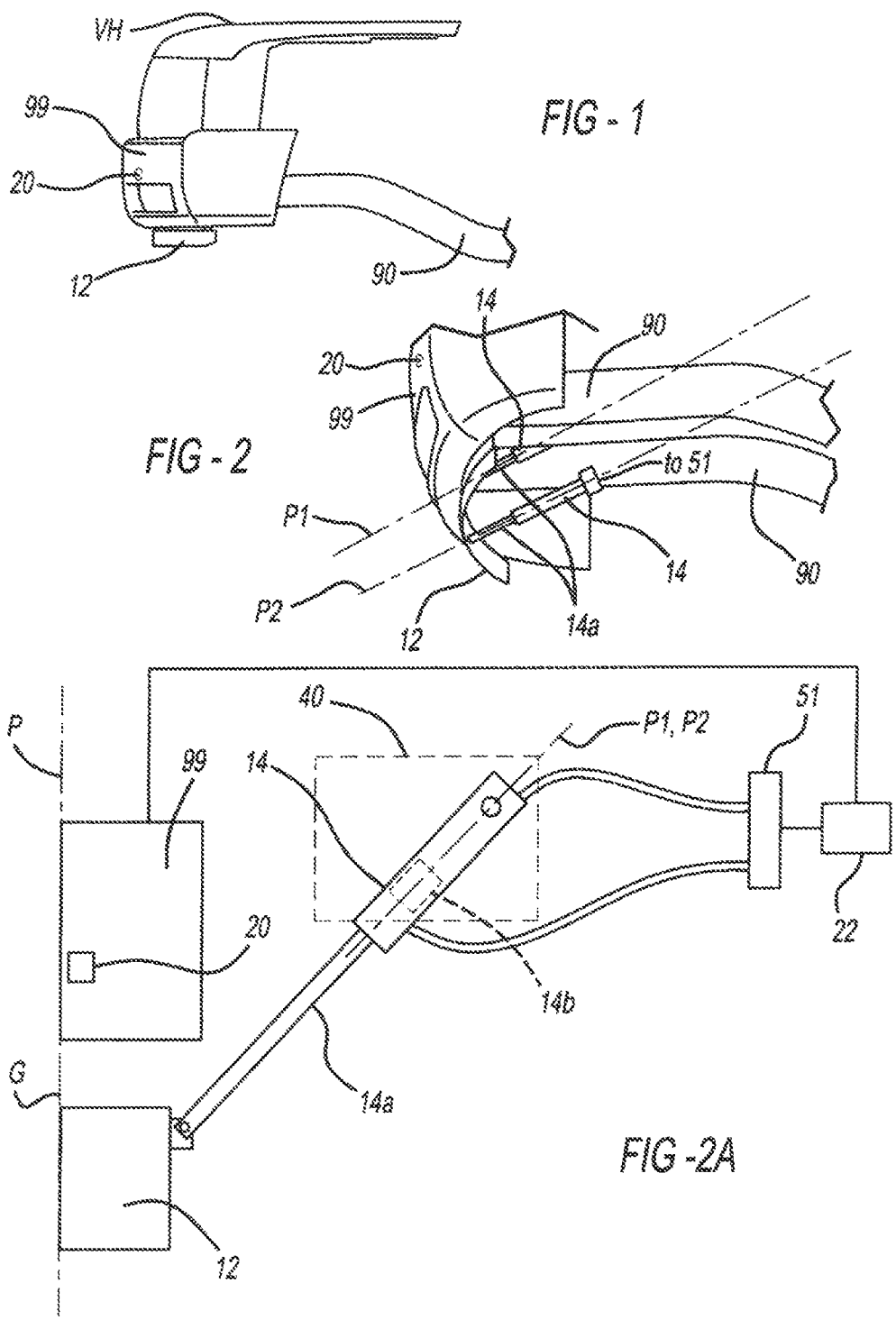

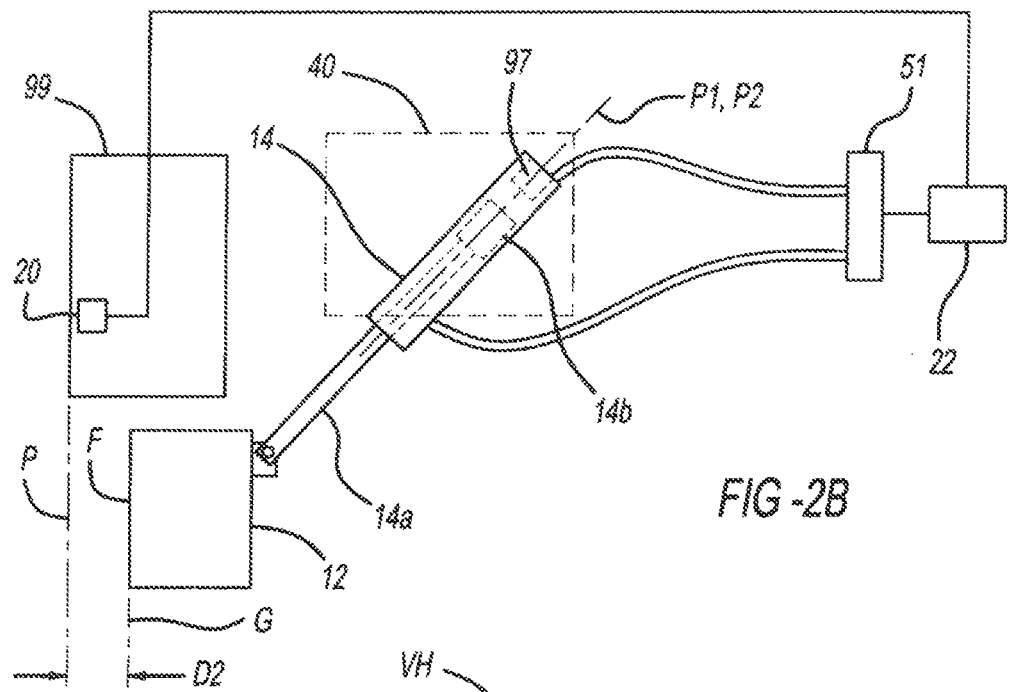
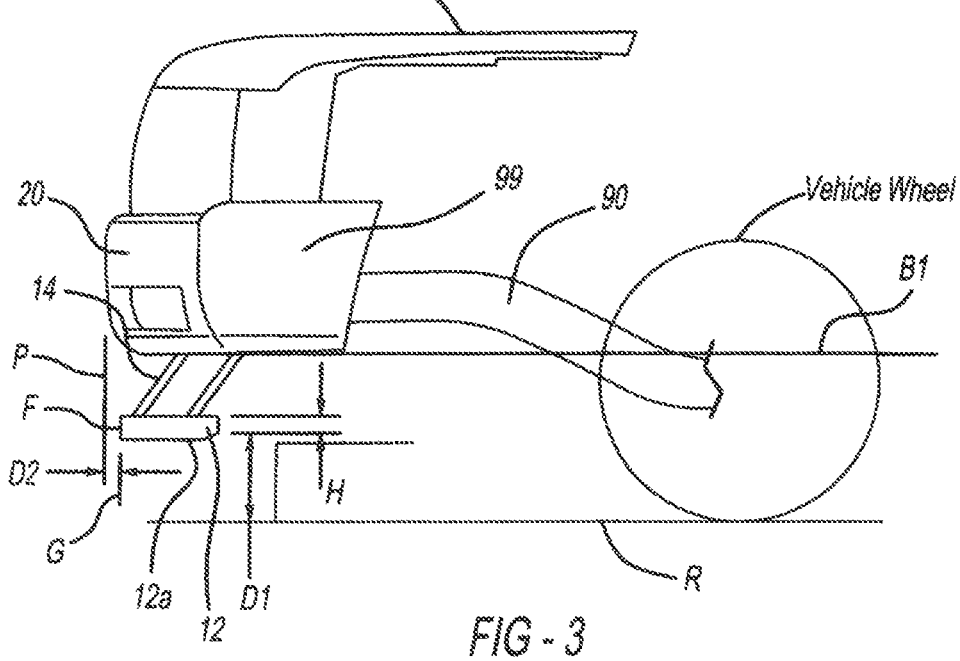

# ACTIVE KNEE PROTECTION SYSTEM

CROSS-REFERENCE TO RELATED APPLICATIONS

This application claims the benefit of U.S. Provisional Application Ser. No. 61/922,077 filed on Dec. 30, 2013, the disclosure of which is incorporated herein by reference in its entirety. This application is also a continuation-in-part application of co-pending U.S. application Ser. No. 14/557,385 having a filing date of Dec. 1, 2014.

BACKGROUND OF THE INVENTION

Currently, in SUV's and light weight trucks, it is often difficult to mitigate leg injuries and prevent "submarining" of a pedestrian beneath a vehicle after contact between a moving vehicle and the pedestrian. This is due to higher bumper heights typical of these types of vehicles, and the difficulty of packaging a fixed low-mounted energy-absorbing member due to vehicle styling demands, off-road performance needs, and other factors. Thus, a need exists for an active system designed to detect, catch and support the lower leg of a pedestrian during impact with a SUV or light weight truck.

SUMMARY OF THE INVENTION

In one aspect of the embodiments described herein, an active leg engagement system for a vehicle includes a selectively deployable leg-engaging member.

In another aspect of the embodiments of the described herein, a leg engagement system for a vehicle is provided. The system includes a deployable leg-engaging member and is structured such that the leg-engaging member resides in a stowed position prior to activation. The system is also structured such that the leg-engaging member is movable, prior to contact between a vehicle and a pedestrian, to a deployed position wherein at least a portion of the leg-engaging member is positioned between a front bumper of the vehicle and a driving surface on which the vehicle resides.

BRIEF DESCRIPTION OF THE DRAWINGS

The accompanying drawings, which are incorporated in and constitute a part of this specification, illustrate embodiments of the invention and together with the description serve to explain principles of the invention.

FIG. 1 is a partial side view of a front end of a vehicle including a leg engagement system in accordance with one embodiment described herein, shown in a stowed or pre-activation condition.

FIG. 2 is a partial perspective view of an underside of the front end of the vehicle of FIG. 1, showing the leg engagement system embodiment shown in FIG. 1.

FIG. 2A is a schematic view of a leg engagement system in accordance with one embodiment described herein, shown in a fully-deployed or extended condition.

FIG. 2B is a schematic view of a leg engagement system in accordance with another embodiment described herein, shown in a fully-deployed or extended condition.

FIG. 3 is the side view of FIG. 1, showing the embodiment of the leg engagement system in a fully deployed or extended condition.

DETAILED DESCRIPTION

Figure 4:
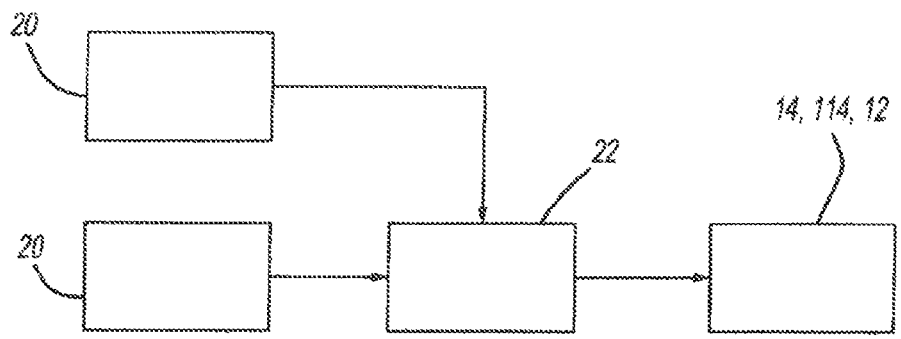
FIG. 4 is a schematic block diagram of a leg engagement system in accordance with one embodiment described herein.

Like reference numerals refer to like parts throughout the description of several views of the drawings. In addition, while target values may be recited for the dimensions of the various features described herein, it is understood that these values may vary slightly due to such factors as manufacturing tolerances, and also that such variations are within the contemplated scope of the embodiments described herein.

FIGS. 1-7 show various embodiments of a vehicle-mounted leg engagement system (generally designated 10). The leg engagement system incorporates a leg-engaging member 12 which is movable to a predetermined position in relation to a road or driving surface, so as to engage the leg of a pedestrian at, below, above, or more generally proximate to, the knee when the vehicle contacts the pedestrian, or as soon as possible after contact between the vehicle and the pedestrian. In particular embodiments, leg-engaging member 12 is positioned to contact the knee and/or the lower ½ of the tibia, for example, of an adult pedestrian positioned in front of the vehicle bumper 99 when the system is deployed. In the fully deployed position of the leg-engaging member 12, the leg-engaging member 12 aids in preventing "submarining" of a pedestrian under the vehicle in the event of an impact. As used herein, the term "submarining" refers to movement of a pedestrian or a portion of a pedestrian under the front bumper and/or body of a moving vehicle after contact of the vehicle with the pedestrian.

In the embodiments shown in FIGS. 1-5, leg engagement system 10 includes a movable energy-absorbing leg-engaging member 12. In one embodiment, the leg-engaging member 12 may include an airbag that when deployed is crescent-shaped and/or substantially follows or has the same curvature as the portion or contour of the vehicle front bumper residing just above the leg-engaging member when the member is in a deployed condition. Leg-engaging member 12 may be formed from any suitable energy-absorbing material, for example, a foam material, a polymer, a rubber, a silicone, one or more metallic materials, etc. Leg-engaging member 12 may also be formed from an inflatable plastic bag, an airbag, membrane or receptacle, which may be inflated by a suitable gas generating system (for example, a squib or gas generating system operatively coupled to the receptacle) or other source of inflation fluid (for example, an air line operatively coupled to a reservoir charged by operation of a compressor) responsive to an activation signal. Known expandable energy absorbers such as an airbag may be employed that essentially are designed to envelope at least a portion of a contour about the bumper once the airbag is actuated. U.S. Pat. Nos. 8,408,350, 8,864,167, 8,840,140, 8,801,030, 8,764,056, 8,714,587, 8,696,019, 8,622,416, 8,500,161, 8,172,027, and 8,505,969, incorporated herein by reference in their entirety, exemplify but do not limit the known airbags or expandable energy absorbers contemplated in this invention. U.S. Pat. Nos. 8,840,138, 6,422,601, 6,805,377, 6,659,500, 6,749,219, 6,752,421, 8,419,057, 7,739,957, and 7,591,481, incorporated by reference in their entirety, exemplify but do not limit the gas generating means such as pyrotechnic, stored gas, hybrid, or compressed gas generators or inflators contemplated in accordance with the present invention. These same references are applicable to the embodiments described throughout this application, such as those described in FIGS. 10A-10D.

In a particular embodiment, a dimension H denoting a height or thickness of the leg-engaging member along the surface of the member which contacts the leg of a pedestrian, is within the range 20 to 150 millimeters, depending on the type of energy-absorbing material used in the leg-engaging member, the available spacing between the driving surface and the vehicle bumper, and other pertinent factors.

In the embodiments described herein, the leg engagement system 10 is an active mechanism, meaning that the leg-engaging member 12 is selectively deployable from a normally stowed or retracted (i.e., undeployed) condition (shown in FIGS. 1 and 2) to a fully deployed condition designed to engage the leg of a pedestrian, responsive to the occurrence of a predetermined condition or set of conditions. The fully-deployed position is reached prior to contact between the vehicle and the pedestrian.

In certain embodiments, the leg-engaging member 12 is mounted on actuators in the form of one or more telescoping arms 14 operatively coupling the leg-engaging member 12 to a portion of the vehicle. The embodiments shown in FIGS. 1-5 utilize two spaced-apart telescoping arms 14, with one arm connected to the leg-engaging member 12 proximate each end of the member. However, any desired number of telescoping arms may be used. Also, arms 14 may be connected to the leg-engaging member 12 at any desired location or locations along the member, depending on the operational, structural or dimensional requirements of the particular application.

Referring to FIG. 2A, in one embodiment, each of arms 14 is in the form of a pneumatic or hydraulic piston-and-cylinder arrangement. A piston rod 14a is attached to the piston so as to move along with the piston (not shown). A portion of the leg-engaging member is attached to an end of each piston rod 14a. In a known manner, activation of the leg engagement system 10 causes pressurized fluid to be introduced into (or to flow within) the cylinders, resulting in movement of the pistons 14b along interiors of their associated cylinders. For example, a compressor system may be provided to provide compressed gas to the leg engagement system as described and exemplified in U.S. Pat. No. 7,591,481, herein incorporated by reference in its entirety. Movement of the pistons 14b produces movement of the rods 14a attached to the pistons, and also a corresponding movement of the leg-engaging member 12 attached to the ends of the rods 14a, to the fully deployed position of the leg-engaging member.

FIG. 2A shows one example of a system employing actuatable arms 14 in the form of piston-and-cylinder arrangements. In addition to arms 14 and leg-engaging member 12, this embodiment of the system includes a controller 22 coupled to the arms 14 for controlling deployment of the leg-engaging member 12 in accordance with predetermined criteria, and one or more pressurized fluid sources and associated fluid flow control mechanisms (including valving, solenoids, etc.) (generally designated 51) operatively coupled to the controller 22 and to the cylinders 14 and structured to provide pressurized fluid to the arms when desired.

Arms 14 may be structured, oriented and operatively coupled to the vehicle so that the parallel longitudinal or thrust axes P1 and P2 of the arms are directed toward or aligned with the final deployment position of the leg-engaging member 12, and so that the strokes of the arms, when actuated, move the leg-engaging member 12 into the desired fully deployed position.

Pressurized fluid source(s) for the system may include, for example, a reservoir charged by operation of a compressor and other known elements for a pneumatic system as described in U.S. Pat. No. 7,591,481 for example; a reservoir, pump, and other known elements for a hydraulic system; a gas generating system (for example, a known micro-gas generating system, or MGG) 97 as shown in FIG. 2B; or any other suitable fluid source. A separate pressurized fluid source may be operatively coupled to each cylinder 14. Alternatively, a common pressurized fluid source may be coupled to both of arms 14.

Controller 22 may be a system controller already installed in the vehicle, or the controller may be a dedicated leg engagement system controller.

The leg engagement system 10 may be activated by a signal received from a suitable sensor (or sensors) 20, or from controller 22 responsive to a sensor input received by the controller 20. Sensor(s) are configured to detect the presence of a pedestrian in front of the vehicle out to at least a distance sufficient to permit positioning of the leg-engaging member in the leg-engaging position prior to contact of the vehicle with the pedestrian, at vehicle speeds within the operational ranges described herein. Types of sensors which may be used include known radar, lidar, vision or any other suitable sensors configured to detect the presence of a pedestrian in front of the vehicle and to generate a leg engagement system activation signal in time for the system to be activated prior to contact between the pedestrian and the vehicle. Sensor(s) 20 used to detect the presence of the pedestrian may be existing vehicle sensors or dedicated leg engagement system sensors operatively coupled to the leg engagement system controller 22 or coupled directly to an element such as a gas generating system structured to supply pressurized fluid to the arms upon receipt of a suitable control signal.

In another embodiment (not shown), the telescoping arms 14 are spring-loaded. The arms are maintained in a stowed or retracted position by a disengageable lock (using for example, a suitable solenoid) prior to deployment of the leg-engaging member 12. Suitable spring members are configured and operatively coupled to the arms so as to rapidly urge the arms to an extended or deployed position upon deactivation or release of the lock. The lock may be deactivated by a system actuation signal received from a controller. The controller signal is sent responsive to a signal from a sensor means (for example, a suitable radar, lidar, vision system, etc.) indicating that contact with a pedestrian may be imminent. This enables the spring-loaded arms to be extended and the leg-engaging member 12 moved to its fully-deployed position prior to contact between the vehicle and the pedestrian. Upon deactivation of the lock, the arms extend, thereby positioning the leg-engaging member 12 in its final, fully-deployed position. The leg-engaging member 12 may later be reset (for example, manually) for subsequent use.

Referring to FIGS. 8A-9B, in other embodiments, the leg-engaging member 12 is mounted on one or more swingable deployment arms 114 operatively coupling the leg-engaging member to a portion of the vehicle. The embodiments shown in FIGS. 8A-9B utilize two deployment arms, with one arm connected to the leg-engaging member 12 proximate each end of the member. However, any desired number of deployment arms may be used. Also, arms 114 may be connected to the leg-engaging member at any desired location of locations, depending on the operational, structural or dimension al requirements of the particular application. In addition, arms 114 may be rotatably coupled to housing 40 or directly to a portion of the vehicle (for example, frame 90). Also, in addition to controller 22 and any required sensors, each of the embodiments shown in FIGS. 8A-9B may include any pressurized fluid sources, valving, electronic controls, and/or any other components known in the art and required for functioning of the particular embodiment as described herein.

In the embodiments shown in FIGS. 8A-9B, arms 114 and the leg-engaging member 12 attached thereto reside in a stowed condition as previously described, prior to activation of the leg-engagement system. However, rather than extending and retracting along longitudinal axes of the arms to deploy the leg-engaging member 12 as previously described with regard to arms 14, arms 114 are operatively coupled to the vehicle so as to swivel or rotate along a pre-defined arc relative to the vehicle to deploy the leg-engaging member 12.

Figure 8A:
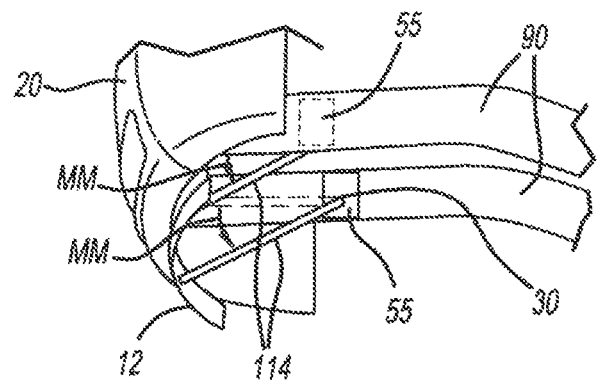
FIG. 8A is a schematic view of a swing-type leg engagement system in accordance with an embodiment described herein, shown in a stowed or pre-activation condition.
Figure 8B:
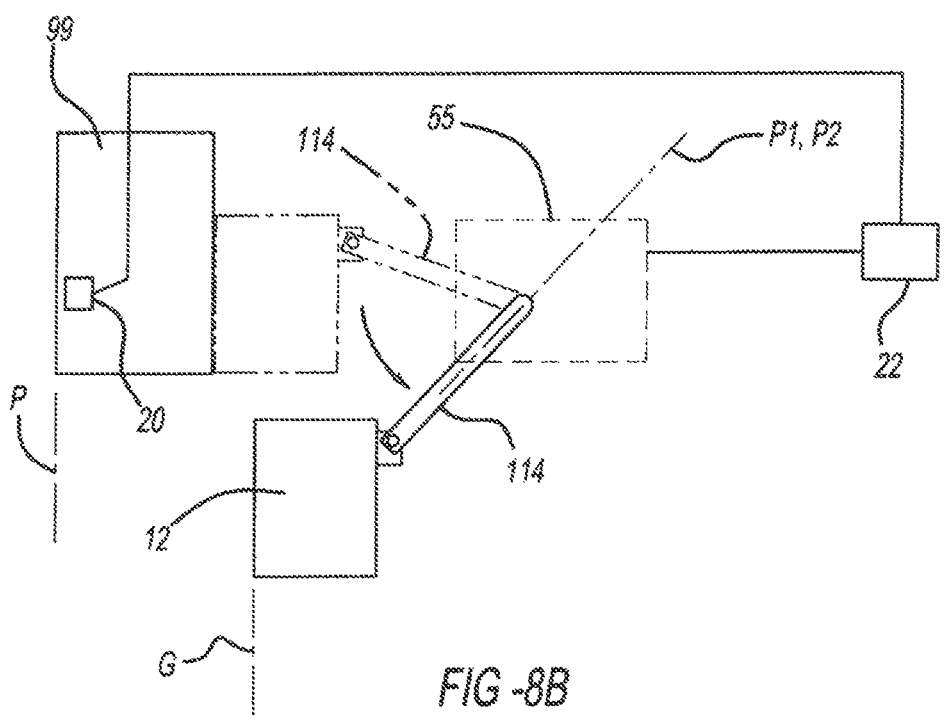
FIG. 8B is a schematic view of the swing-type leg engagement system embodiment shown in FIG. 8A

FIG. 8A shows the swingable arms and the leg-engaging member 12 in a stowed or pre-activation condition. In the embodiment shown in FIGS. 8A-8B, after system activation, the deployment arms 114 move from their stowed positions, swinging or rotating generally downwardly as indicated by arrows MM to position attached the leg-engaging member 12 below the bumper as shown in FIG. 8B.

Figure 9A:
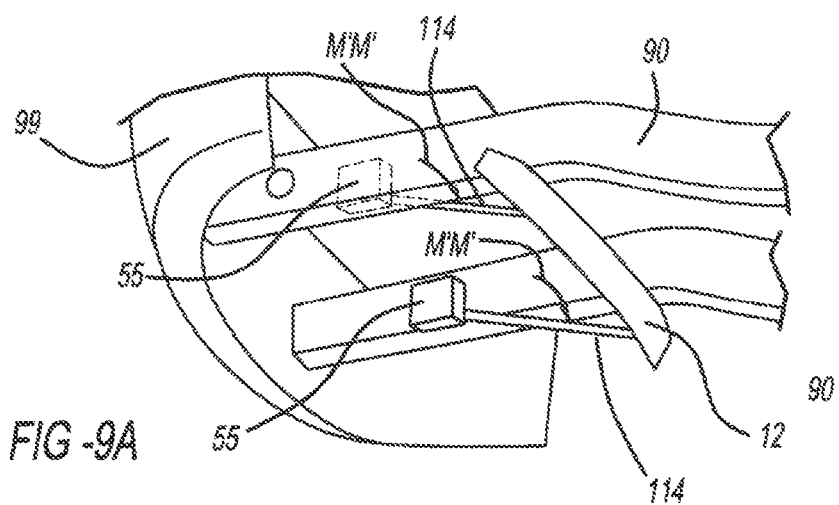
FIG. 9A is a schematic view of a swing-type leg engagement system in accordance with another embodiment described herein, shown in a stowed or pre-activation condition.
Figure 9B:
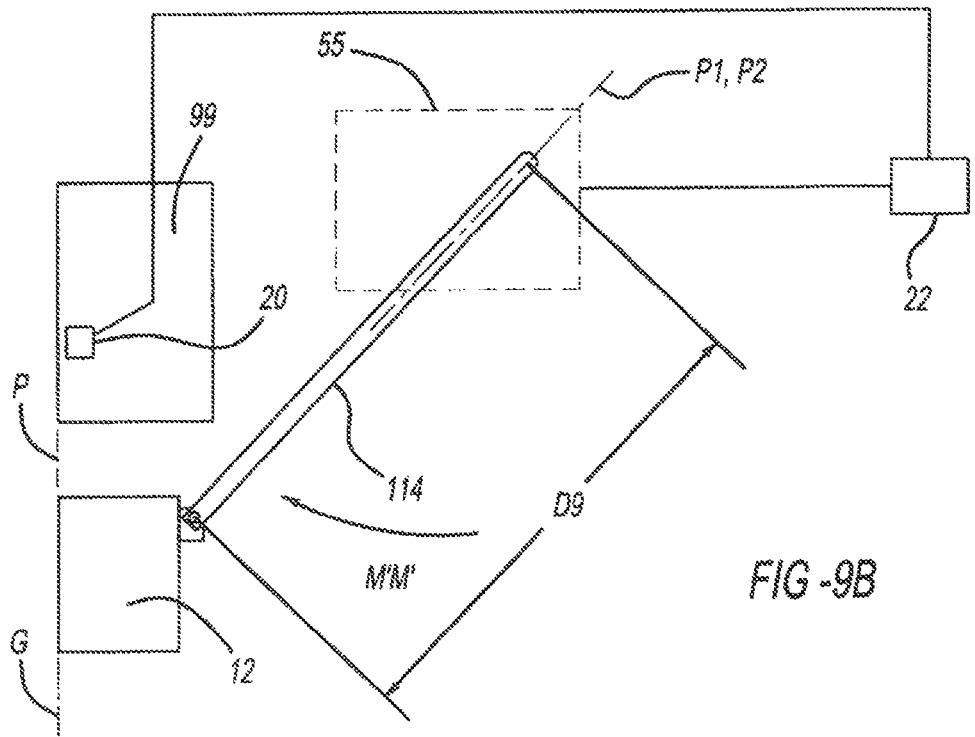
FIG. 9B is a schematic view of the swing-type leg engagement system embodiment shown in FIG. 9A.

FIG. 9A shows the swingable arms and the leg-engaging member 12 in a stowed or pre-activation condition in another embodiment of the system. In the particular embodiment shown in FIGS. 9A-9B, after system activation, the deployment arms 114 move from their stowed positions, swinging or rotating generally forwardly and downwardly as indicated by arrows M'M' to position the leg-engaging member 12 below the bumper as shown in FIG. 9B.

Arms 114 may be operatively coupled to any suitable type of known rotary actuator (generally designated 55), for example, a stepper motor and associated sensors and/or position encoder and other hardware; a stepper motor and associated gear train, sensors and/or position encoder and other hardware; a known fluid power rotary actuator and associated hardware, or any other suitable rotary actuator. Such actuators are available from a variety of vendors. A separate rotary actuator 55 may be coupled to each of arms 114, or both arms may be rotated by a single rotary actuator (as shown in FIG. 7A). The type of rotary actuator used will be specified according to such factors as the vehicle size envelope into which the leg engagement system is to be positioned, the torque requirements for a particular design of leg-engaging member 12 and rotating arms 114, and other pertinent factors.

The rotary actuator(s) 55 are operatively coupled to controller 22. Upon receipt of an activation signal from the controller (and as described elsewhere herein), the rotary actuator (s) operate to swing the arms 114 downwardly and/or along the desired arcs until the leg-engaging member 12 reaches its deployment position. If desired, one or more hard stops (not shown) may be operatively coupled to arms 114 to limit rotation motion of the arms in a manner known in the art.

The leg engagement system is also structured to maintain the leg-engaging member 12 in the fully deployed position responsive to reaction forces exerted on the leg-engaging member by a pedestrian in contact with the member. In an embodiment using pressurized fluid to control arm extension, the reaction forces may be absorbed in a known manner by the pressurized fluid in the arms.

In particular embodiment (for example, embodiments employing spring loaded arms as described herein), a locking mechanism (not shown) may be incorporated into (or operatively coupled to) the leg engagement system for locking the leg-engaging member 12 in a deployed position or orientation. The locking mechanism may engage automatically when the leg-engaging member 12 reaches a fully-deployed position, and may be manually disengaged to reset the position of the leg-engaging member 12 for additional uses. Any of a variety of known mechanisms or methods may be employed to maintain the leg-engaging member 12 in a deployed orientation or condition.

In one embodiment, a leg engagement system 10 as described above is built into the structure of the vehicle. The mechanism for deploying the leg-engaging member 12 may be operatively coupled to a vehicle controller and/or to sensors installed in the vehicle during manufacture. In a particular embodiment, the leg-engaging member 12 is an inflatable member which resides stowed in a deflated condition inside a cavity formed in the vehicle bumper. An activation signal from a sensor or controller triggers a gas generating system operatively coupled to an interior of the leg-engaging member 12 so as to generate pressurized gases to inflate the member. After deployment, the leg-engaging member 12 may remain in the inflated or expanded condition until the inflation gases are vented and the leg-engaging member 12 is reloaded into the bumper for subsequent use. The use of a rapidly-acting gas generating system enables relatively rapid deployment of the leg-engaging member 12 after the vehicle sensors 20 responsive to detection of a pedestrian in close proximity to the front of the vehicle.

The particular method used to position the leg-engaging member 12 prior to contact with a pedestrian will be determined by factors such as the available envelope size into which the leg engagement system may be installed; whether the leg engagement member is to deployed and retracted during normal vehicle operation, or deployed only when contact with a pedestrian is deemed to be imminent; the response time of the system (from detection of a pedestrian to positioning of the leg engagement member in the deployed position prior to contact with the pedestrian); the distance of the leg engagement member from the stowed position to the deployed position, and other pertinent factors.

In an embodiment employing swingable or rotatable arms 114, the arms may be structured to enable adjustment of the lengths of the arms (for example, using a telescoping structure), or to enable variation of the distance D9 (shown in FIG. 9B) between pivot locations of the arms on the housing or vehicle, and the locations on the arms 114 at which the leg-engaging member 12 is attached. This provides additional flexibility in positioning of the leg-engaging member 12, as described elsewhere herein.

In a particular embodiment, the leg engagement system includes a housing 40 to which other components of the leg engagement system (for example, leg-engaging member 12, sensor(s) 20, controller 22, telescoping arms 14, and any associated actuation mechanism (not shown), and any other desired component(s) may be mounted so as to form a module which may be affixed to the vehicle frame or to another suitable portion of the vehicle. The housing enables mounting of the leg engagement system components thereto and fixing of the positions and orientations of the components with respect to each other, to facilitate leg engagement system installation and proper operation of the system. The housing also enables the leg engagement system to be more easily retrofit onto an existing vehicle. Mounting aids such as suitable spacers or mounting brackets (not shown) may also be used to aid in attaching the housing to a given vehicle.

Figure 7:
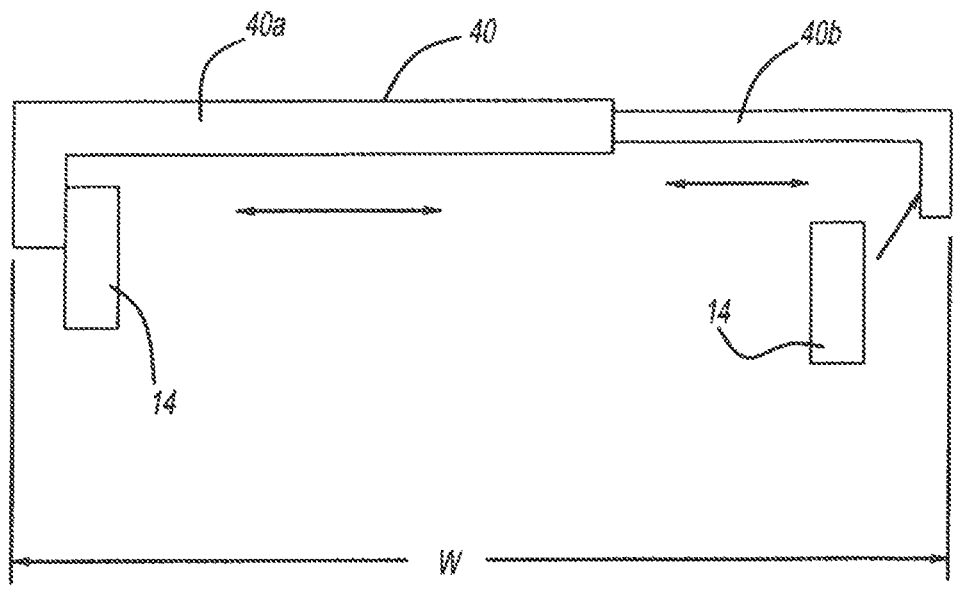
FIG. 7 is a schematic view of one embodiment of a leg engagement system housing to which other elements of the leg engagement system may be attached to facilitate installation in of the system a vehicle.
Figure 7A:
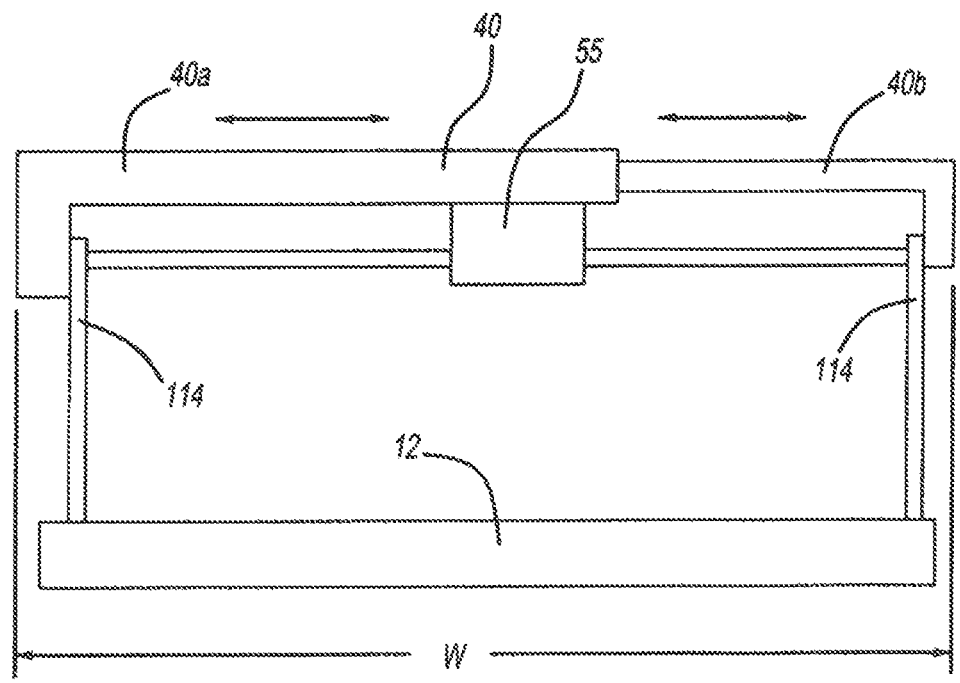
FIG. 7A is a schematic view of a leg engagement system housing to which other elements of another embodiment of a leg engagement system may be attached to facilitate installation in of the system a vehicle.

FIG. 7 is a schematic view of one embodiment of a housing 40 suitable for mounting the other leg engagement system components thereon. In the embodiment shown in FIG. 7, housing 40 includes a first portion 40a and a second portion 40b structured so as to be slidable or otherwise positionally adjustable with respect to the first portion when coupled to the first portion. In the embodiment shown, first and second portions 40a and 40b are structured to permit a width W of the housing (extending perpendicular to a fore-aft axis of the vehicle when mounted in the vehicle) to be adjusted, and the housing portions secured in position to maintain the desired width dimension. This adjustability of the housing width facilitates attachment of the housing to vehicle frames of various sizes. After the housing portions 40a and 40b have been fixed in position with respect to each other, other elements of the leg engagement system may be attached to the housing portions, using fasteners, welds, or any other suitable method or methods. Housing may be formed from any suitable material or materials (for example, metallic materials, polymers, etc.). The telescoping arms 14 may be attached to the housing portions as shown and in accordance with one of the embodiments described herein.

FIG. 7A is a schematic view similar to FIG. 7, showing an embodiment in which swingable or rotatable arms 114 are attached to housing 40. In the embodiment shown in FIG. 7A, arms 114 are shown rotatably attached to housing portions 40a and 40b. Arms 114 are rotated by a single rotary actuator 55 operatively coupled to the arms and to housing 40 (or directly to the vehicle). Alternatively, each of arms 114 may be operatively coupled to a separate rotary actuator.

In addition, the other elements of the leg engagement system may be attached to the housing portions prior to fixing of the housing portions 40a and 40 in position with respect to each other. This permits the housing width W to be adjusted for attachment to portions of a specific vehicle, according to the requirements of a particular application and with the other system elements already attached.

In another embodiment, the housing 40 is formed as a single, unitary structure having a non-adjustable width W. The width dimension W is specified so as to facilitate mounting of the housing to a frame or portions of a specific vehicle design.

As described herein, the module may incorporate or be operatively coupled to an existing vehicle controller and/or sensors, or the module may be self-contained, incorporating its own controller and/or sensor(s) configured to actuate the leg-engaging member 12 prior to contact between the vehicle and the pedestrian, according to one or more of the operational modes described herein.

In particular embodiments, the leg engagement system is structured such that the final positions and/or orientations of various components of the leg engagement system are adjustable with respect to the portions of the vehicle to which they are mounted. For example, cylinders 14 may be adjustable-stroke cylinders. Such cylinders are known in the pertinent art and are available from any of a variety of suppliers, for example TRD Manufacturing, Inc. of Machesney Park, Ill.

Also, where the cylinders 14 are attached to a housing 40 as described herein, a portion of each cylinder may be rotatably attached to an associated housing portion to permit adjustment of the cylinder angular orientation with respect to the housing, according to the requirements of a particular application. The cylinder may be pivoted about the rotatable connection to provide the desired angular orientation, and then secured in this orientation using a pin, fasteners, or any other suitable securement mechanism. Alternatively, rotatability of the cylinder with respect to the vehicle frame may be provided by direct rotatable attachment of the cylinder to the vehicle frame. Alternatively, rotatability of the cylinder with respect to the vehicle frame may be provided by attachment of a suitable bracket to the frame, with respect to which the cylinder may be structured to rotate when coupled thereto. This enables adjustment of the orientation of the cylinder with respect to the vehicle frame without the need to mount the cylinder on a separate housing.

In addition, where the cylinders 14 are attached to a housing 40 as described herein, the cylinders may be mounted to associated portions of the housing so as to permit slidable movement of the cylinder with respect to the housing along the axis (either axis P1 or P2, FIG. 2) of extension of the telescoping arms. The cylinder body may be slidably positioned along the housing according to the requirements of a particular application and then secured in a given position using a pin, fasteners, or any other suitable securement mechanism. Alternatively, slidability of the cylinder with respect to the vehicle frame may be provided by attachment of a suitable bracket or other hardware to the frame, along which the cylinder may be structured to slide when coupled thereto. This enables adjustment of the location of the cylinder along the deployment axis without the need to mount the cylinder on a separate housing.

In addition, the leg-engaging member 12 may be rotatably connected to the ends of cylinders 14 or arms 114 (using for example, a pin), so as to permit adjustment of the angular orientation of the leg-engaging member 12 with respect to the projected path of loading by the pedestrian, and in accordance with the final deployed position of the member. The leg-engaging member 12 may be oriented as needed and secured in the desired orientation using any suitable method.

Other portions of the system may also be positionally and/or rotationally adjustable so as to provide flexibility with regard to installation of the system in a vehicle, while ensuring that the fully deployed position of the leg-engaging member 12 is attained after activation of the system. More specifically, the adjustability described provides flexibility in the positioning and attachment of the system components to the vehicle so as to ensure that the leg-engaging member 12, when fully deployed, resides at a location D2 with respect to the vehicle bumper and at a location D1 with respect to the driving surface, as defined by the dimensional ranges described herein.

In one mode of operation, the leg engagement system 10 is configured for a single activation. The system must then be manually reset or reconfigured for a subsequent use, by a user or by a service center. One example of such an embodiment is shown in FIG. 2B, where a gas generating system (for example, a suitable micro-gas generator or MGG) provides the pressurized fluid source for actuation of arms 14. After a single activation of the system and deployment of the leg-engaging system, the gas generating system must be replaced by a service center.

In another mode of operation, the leg engagement system 10 is automatically resettable and reusable (i.e., the system is resettable without the need for action by a user to reset the system). One example of such an embodiment is shown in FIG. 2A, where fluid flow to either side of the piston in the cylinder 14 is controlled by operation of the controller 22 on the valving 51 controlling fluid flow to the portions of the cylinder 14. Direction of the pressurized fluid to either side of the piston 14b controls extension and retraction of the arms 14 in a known manner.

Referring to FIGS. 1-3, prior to activation of the leg engagement system, the leg-engaging member 12 is stored in a retracted or undeployed condition along an underside of the vehicle prior to activation of the leg engagement system. This prevents contact between the leg-engaging member and the driving surface R when the vehicle is driven off-road or along uneven road surfaces. The leg engagement system 10 is also structured and installed so as not to increase the length of the vehicle when the leg-engaging member is in a stowed position (as shown in FIGS. 1 and 2).

The height above the road surface of the leg-engaging member 12 prior to activation of the system will generally be specified by the vehicle manufacturer, and may be set according to the system stroke length, any packaging constraints governing positioning and/or installation of the leg engagement system, the intended use of the vehicle when leg-engaging member 12 is stowed, and other pertinent factors so as to ensure that the height D1 of the leg-engaging member 12 above the road surface when deployed is within the desired range for operational effectiveness, as previously described. However, in the embodiments described herein, the distance of the leg-engaging member 12 from the driving surface prior to activation (i.e., in the stowed condition) will always be greater than the distance D1 of the leg-engaging member 12 from the driving surface when deployed.

In a particular embodiment, the leg engagement system 10 is structured so that when the leg-engaging member 12 is in the stowed condition, the entire leg-engaging member 12 is positioned above a plane defined by a lower edge of the vehicle bumper, as defined by a plane B1 shown in FIG. 3. This aids in reducing aerodynamic drag that might result from portions of the leg-engaging member 12 extending below the bumper when the leg-engaging member 12 is in the stowed position.

In a particular embodiment, the dimension D1 denoting the height above the road surface of the leg-engaging member 12 when the leg-engaging member is in a fully-deployed and locked condition, is within the range 150 to 930 millimeters.

Referring to FIG. 3, the dimension D2 denotes a distance of a vertical plane G passing through a forward-most surface F of the leg-engaging member 12, from a vertical plane P passing through a forward-most surface of the front bumper 20 when the leg-engaging member 12 is in a fully-deployed and locked condition. Thus, in a leg-engaging member 12 which follows the contour of the bumper 99, the distance between plane P passing through surface F and following the contour of the bumper and a plane G passing through surface F and following the contour of the leg-engaging member, will be constant or substantially constant along the entire length of the leg-engaging member. The distance D2 of the forward-most contact surface of the leg-engaging member 12 from the bumper plane P may need to be adjusted in order to accommodate operational requirements in different bumper and vehicle designs. It certain embodiments, it may be desirable to achieve coplanarity or substantial coplanarity of plane P with plane G (for example, as shown in FIG. 2A). In a particular embodiment, the leg-engaging member plane G is coplanar with plane P within a range of +/−50 millimeters when the leg-engaging member 12 is in a fully-deployed and locked condition.

As described herein, the deployable arms 14 are structured to move the leg-engaging member 12 from a stowed position (shown in FIGS. 1 and 2) to the fully deployed position shown in FIG. 3 within a desired predetermined time after activation of the leg engagement system 10. In one embodiment, the arms 14 are activated to position the leg engagement member 12 only when contact between the vehicle and a pedestrian is deemed to be imminent. In such cases, the leg engagement member 12 must be deployed relatively rapidly, and the employed should be capable of positioning the leg engagement member 12 in the desired leg engagement position prior to any contact between the vehicle and the pedestrian, In particular embodiments, the system is configured to position the leg engagement member 12 in the desired leg engagement position within 300 milliseconds of receipt of an actuation signal from a sensor or controller. Further to the discussion of FIGS. 10A-10D provided below, it will be appreciated that an expandable energy device such as an airbag 112 may be deployed as per this embodiment, whereby the leg engagement member 12 is not only positioned to meet the leg(s) of the pedestrian within 300 milliseconds, but is also actuated or deployed to present a softer cushion (e.g. airbag 112 shown in FIG. 10B) as the leg of the pedestrian impacts the leg engagement member 12.

In another embodiment, the system is configured so that the leg-engaging member 12 resides in a stowed position when the vehicle is travelling at a speed within the range 0-10 MPH and also when the vehicle is traveling at a speed above 25 MPH. The arms deploy when the vehicle reaches a speed above 10 MPH to position the leg engagement member 12 in its leg engagement position, and revert to the stowed condition when the vehicle reaches a speed above 25 MPH. In this mode of operation, if desired, the leg engagement member 12 may be deployed more slowly than required for an imminent contact with the pedestrian. For purposes of this embodiment, the controller may be operatively coupled to any sensor or other means (for example, a speedometer or wheel speed sensor) useable for measuring or calculating vehicle speed. The particular range of vehicle speeds over which the leg engagement member 12 is deployed may be determined by the vehicle manufacturer.

In another particular embodiment, the system is configured to deploy the leg engagement member 12 to the desired position when contact between the vehicle and a pedestrian is deemed to be imminent, but only when the vehicle is traveling at a speed within a predetermined range (for example, between 10 to 25 MPH, inclusive).

In a particular embodiment, the system is provided with a system override or disabling means which enables the leg engagement system 10 to be disabled under certain conditions (for example, during off-road driving, when a snow plow is attached to the front of the vehicle, or for any other particular vehicle use). In one embodiment, the disabling means comprises a switch or button in the passenger compartment which enables a user to shut off the leg engagement system 10. In another embodiment, the disabling means comprises a switch attached to the housing 40 or provided under the vehicle hood (labeled VH in the drawings), and also operable by a user. Operation of the disabling means may signal to the controller that no activation signals are to be transmitted to the actuating arms 14 until the leg engagement system is switched on or re-enabled, or otherwise prevent transmission of activation signals to the arms 14.

FIG. 4 is a block diagram of a leg engagement system which is normally in a stowed condition, and which is deployable responsive to detected imminent contact between the vehicle and a pedestrian. In this embodiment, sensor or sensors 20 incorporated into or operatively coupled to the leg engagement system 10 detect the presence of a pedestrian in front of the vehicle. A sensor signal is transmitted to a controller 22, which processes or evaluates the sensor signal in accordance with predetermined leg engagement system activation protocols. Responsive to the result of the signal processing, the controller generates an activation signal which is transmitted to the arms 14 or to any associated fluid control mechanism, resulting in actuation of the arms 14 to deploy the leg engagement system 12 prior to contact between the vehicle and the pedestrian.

Figure 5:
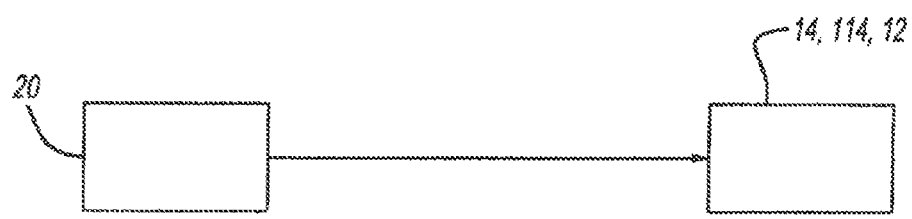
FIG. 5 is a schematic block diagram of a leg engagement system in accordance with another embodiment described herein.

In an alternative embodiment shown in FIG. 5, the arms 14 are activated responsive to a signal sent directly from the sensor to the arms 14 or to an associated fluid control mechanism. A signal from a sensor or a suitable controller activates the gas generator, which actuates the piston-and-cylinder arrangements. The piston rods then extend from the cylinders to deploy the leg-engaging member 12. Other deployment methods are also contemplated. Any deployment mechanism used should be able to, responsive to an activation signal, deploy the leg-engaging member 12 rapidly enough to ensure full deployment prior to contact between the vehicle and the pedestrian.

Figure 6:
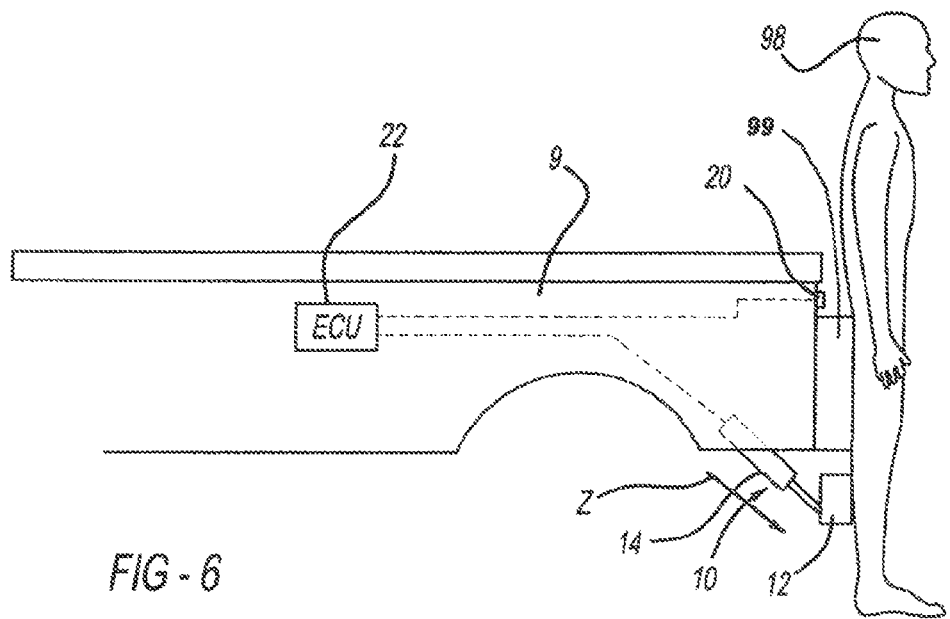
FIG. 6 is a schematic view showing a leg engagement system in accordance with one embodiment described herein, in a fully deployed condition for engaging the leg of a pedestrian.

Referring to FIG. 6, an embodiment of the leg engagement system 10 may be incorporated into a vehicle-mounted pedestrian safety system. FIG. 6 shows a schematic diagram of one exemplary embodiment of such a safety system installed in a vehicle. In FIG. 6, a leg engagement system 10 in accordance with an embodiment described herein may be secured to the vehicle 9 beneath and/or behind the front bumper as previously described. When activated, the leg-engaging member 12 of the system deploys toward the front of the vehicle in the direction indicated by arrow Z, to a position where the lower leg of a pedestrian may be engaged as previously described.

Also, as seen in FIG. 6, when the leg engagement system is fully deployed, the leg-engaging member 12 complements or acts in conjunction with bumper 99 and/or other vehicle features designed to engage the lower body of the pedestrian during contact, to aid in supporting the leg at multiple locations and maintaining alignment of the leg from the hip region down to and including the tibia. For example, bumper 99 and/or other front-mounted vehicle features may be designed to support the leg down to and including the knee joint. By engaging the portion of the leg below the knee to help prevent this portion of the leg from being forced beneath the front of the vehicle, the deployed leg-engaging member 12 helps prevent excessive bending of the leg at the knee, which aids in reducing injury to knee ligaments.

Leg engagement system 10 may be in operable communication with a sensor 20 which is in communication with a processor or controller (ECU 22) as previously described. Controller implements a known algorithm that signals actuation of the gas generating system or valving controlling another pressurized fluid source operatively coupled to each of arms 14. As previously described, activation and/or control of the pressurized fluid source(s) operatively coupled to each of arms 14 may be based on any desired criteria, for example, detected actual or imminent contact of the vehicle with a pedestrian 98, and/or any other desired criteria.

Figure 10A:
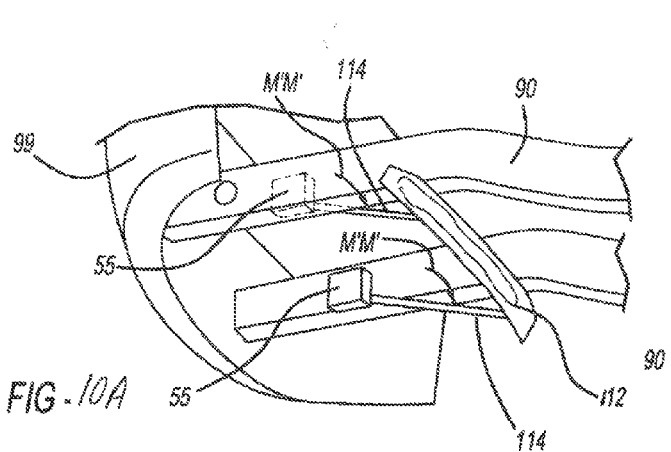
FIG. 10A is a schematic view of a swing-type leg engagement system containing an airbag in accordance with another embodiment described herein, shown in a stowed or pre-activation condition.
Figure 10B:
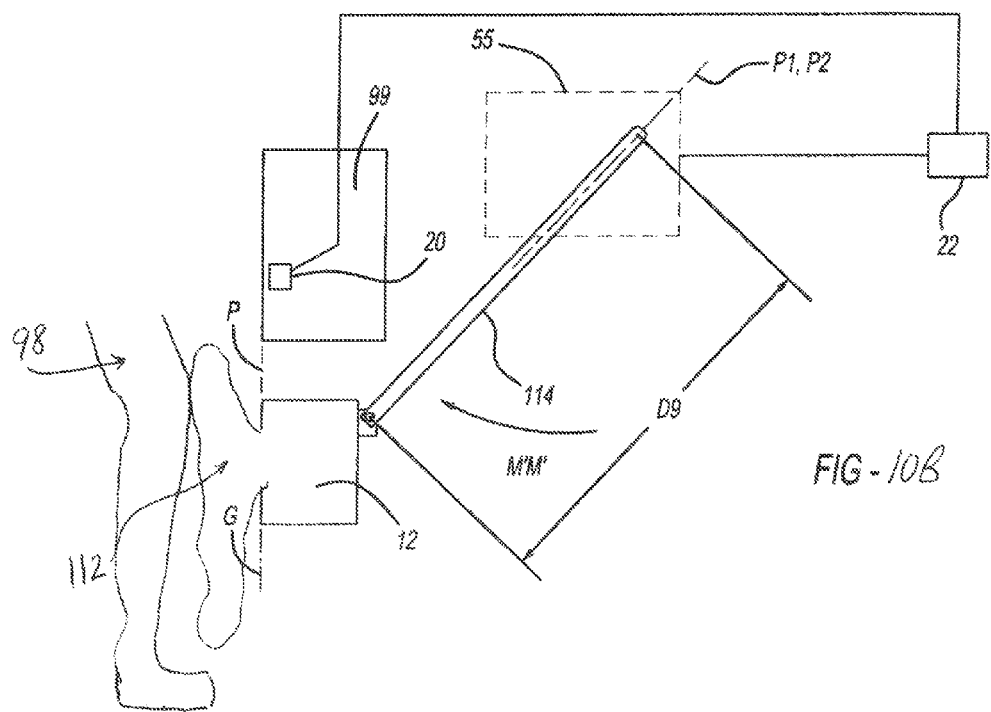
FIG. 10B is a schematic view of a swing-type leg engagement system of FIG. 10A in a deployed condition wherein the airbag has also been activated.

In yet another embodiment exemplified in FIGS. 10A and 10B, it may be seen that an airbag 112 may be provided as the energy absorber 112 in the leg-engaging member 110. A gas generator or gas reservoir 117 may be provided to provide an inflation gas to inflate the airbag 112. As known in the art, an algorithm may cooperate with a ECU 122 as described above, wherein upon receipt of a signal from a pedestrian sensing means 120 the same way, the airbag may also be actuated based on detection by known sensors of a pedestrian that will imminently collide with a frontal portion or bumper of the vehicle. As known in the art, a gas generating means 117 may be a pyrotechnic inflator or gas generator, a stored gas inflator, a hybrid inflator, or a compressed gas source from a pump, for example. As known in the art, the gas generator 117 may electronically communicate with an ECU 122 that is responsive to the pedestrian sensing means 120, thereby actuating the gas generator 117 and as such, inflating the airbag or energy absorber 112. It will be appreciated that the energy absorber 112 may be an airbag as known in the art, or, it may be expandable plastic also as known in the art. As presently contemplated, the airbag or expandable plastic energy absorber 112 must be reconditioned or replaced after being used for pedestrian protection as described herein.

Figure 10C:
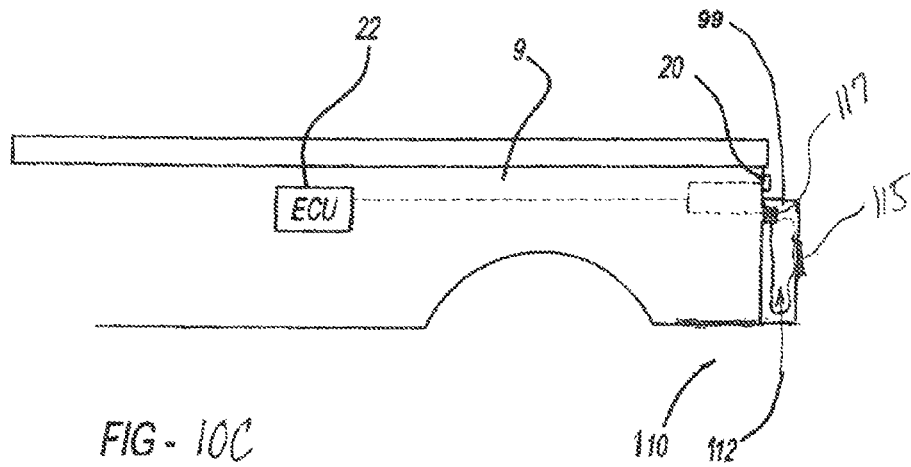
FIG. 10C is a schematic view of a leg-engaging system of the present invention containing a single airbag within a bumper.
Figure 10D:
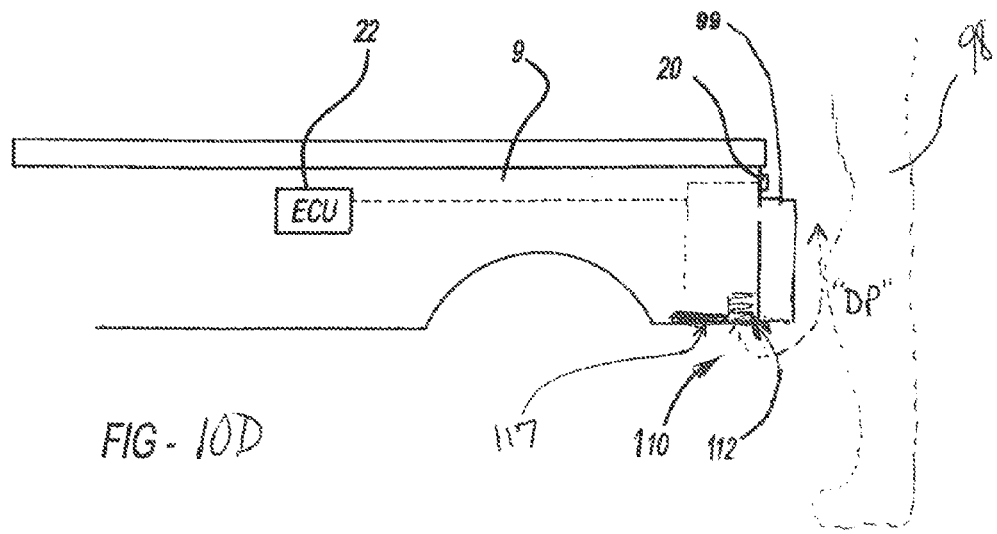
FIG. 10D is a schematic view of a leg-engaging system of the present invention containing a single airbag proximate to or behind a bumper.

Referring to FIG. 10C, and in yet another embodiment of the present invention, a single airbag, expandable plastic device, or energy absorbing device 112 may be stowed within the bumper and released through a weakened portion 115 on the bumper. As with the embodiment shown in FIGS. 10A and 10B, the airbag or expandable plastic is actuated by fluid communication with a gas generator 117 that is actuated upon detection of a pedestrian, or more generally, upon a predetermined condition being satisfied. Again, a known ECU in electronic communication with a pedestrian sensor for example, may be used to actuate the inflator 117 and subsequently, the airbag or expandable plastic 112. Alternatively, as also schematically represented in FIG. 10D, the singular airbag or expandable plastic energy absorbing device 112 may be stowed behind the bumper 99 and packaged in such a manner that the airbag inflates and follows a deployment path that is contoured about the bumper to protect the lower leg of an oncoming pedestrian.

The planned deployment path of the airbag 112 is shown in dotted fashion and is annotated DP, from its position behind the bumper.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described are considered to be within the scope of the invention.

It should be noted that the term "exemplary" as used herein to describe various embodiments is intended to indicate that such embodiments are possible examples, representations, and/or illustrations of possible embodiments and such term is not intended to connote that such embodiments are necessarily extraordinary or superlative examples.

The terms "coupled," "connected." and the like as used herein means the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements, for example "top," "bottom," "above," "below," etc., are merely used to describe the orientation of various elements in the FIGURES. It should be noted that the orientation of various elements may differ according to other exemplary embodiments, and that such variations are intended to be encompassed by the present disclosure.

It will be understood that the foregoing descriptions of the various embodiments are for illustrative purposes only. As such, the various structural and operational features herein disclosed are susceptible to a number of modifications, none of which departs from the scope of the appended claims.

What is claimed is:

1. An active leg engagement system comprising:
   a selectively deployable leg-engaging member; and
   an expandable energy absorbing device stored within said selectively deployable leg-engaging member, said expandable energy absorbing device actuatable upon said system detecting a pedestrian,
   wherein said expandable energy absorbing device is an airbag, and
   wherein the leg-engaging member is structured to reside in a stowed position prior to activation, and wherein the leg-engaging member is structured to be movable, prior to contact between a vehicle and a pedestrian and prior to deployment of the airbag, to a deployed position so the airbag engages a leg of a pedestrian when the pedestrian is positioned in front of a front bumper of the vehicle.

2. The leg engagement system of claim 1 wherein the system is configured to move the leg-engaging member to the deployed position upon detection of the pedestrian in front of the front bumper of the vehicle.

3. The leg engagement system of claim 1 wherein the system is configured to move the leg-engaging member to a pre-positioned deployed position upon the vehicle reaching a predetermined first velocity and is retracted to a non-deployed position at a predetermined second velocity.

4. The leg engagement system of claim 1 wherein said expandable energy absorbing device is actuated by a pyrotechnic gas generator.

5. The leg engagement system of claim 1 wherein said expandable energy absorbing device is actuated by compressed gas or stored gas.

6. The leg engagement system of claim 1 wherein the system is configured to move the leg-engaging member to the deployed position when a speed of the vehicle reaches 10 miles per hour.

7. The leg engagement system of claim 1 wherein the system is configured to return the leg-engaging member to the stowed position when the vehicle speed exceeds 25 miles per hour.

8. A pedestrian safety system including a leg engagement system in accordance with claim 1.

9. A vehicle including a leg engagement system in accordance with claim 1.

10. A vehicle including a pedestrian safety system in accordance with claim 1.

11. A leg engagement system comprising:
    a selectively deployable leg-engaging member;
    an expandable energy absorbing device stored within said selectively deployable leg-engaging member, said expandable energy absorbing device actuatable upon said system detecting a pedestrian; and
    at least one arm operatively coupled to a portion of a vehicle, the at least one arm operatively coupling the leg-engaging member to the portion of the vehicle,
    wherein said expandable energy absorbing device is an airbag.

12. The leg engagement system of claim 11 wherein the system comprises a pair of spaced-apart arms, each arm operatively coupling the leg-engaging member to an associated portion of the vehicle.

13. The leg engagement system of claim 11 wherein the at least one arm is a telescoping arm in the form of a piston-and-cylinder arrangement.

14. The leg engagement system of claim 13 wherein the piston-and-cylinder arrangement is an adjustable-stroke piston-and-cylinder arrangement.

15. The leg engagement system of claim 11 wherein the at least one arm is a rotatable arm.

16. The leg engagement system of claim 15 further comprising at least one rotary actuator operatively coupled to the at least one rotatable arm and configured for rotating the at least one arm upon activation of the leg engagement system.

17. The leg engagement system of claim 11 further comprising an adjustable housing structured for attachment to a portion of the vehicle, and wherein the at least one arm is operatively coupled to the housing.

18. A leg engagement system for a vehicle, the system comprising a deployable leg-engaging member containing an airbag as an energy absorber, the system being structured such that the leg-engaging member resides in a stowed position prior to activation, and wherein the system is structured so that the leg-engaging member is movable, prior to contact between a vehicle and a pedestrian, to a deployed position wherein at least a portion of the leg-engaging member is positioned between a front bumper of the vehicle and a driving surface on which the vehicle resides, wherein the system is structured such that no portion of the leg-engaging member resides between the front bumper and the driving surface when the leg-engaging member is in the stowed position.

19. A pedestrian safety system including a leg engagement system in accordance with claim 18.

20. An active leg engagement system comprising:
a bumper on a vehicle;
a selectively deployable leg-engaging member separate from said bumper; and
an expandable energy absorbing device stored within said selectively deployable leg-engaging member, said expandable energy device actuatable upon said system detecting a pedestrian,
wherein the leg-engaging member is structured to reside in a stowed position prior to activation, and wherein the leg-engaging member is structured to be movable, prior to contact between a vehicle and a pedestrian, to a deployed position so as to engage a leg of a pedestrian when the pedestrian is positioned in front of a front bumper of the vehicle, and
wherein the system is configured to move the leg-engaging member to a pre-positioned deployed position upon the vehicle reaching a predetermined first velocity and is retracted to a non-deployed position at a predetermined second velocity.

21. An active leg engagement system comprising:
a bumper on a vehicle;
a selectively deployable leg-engaging member separate from said bumper; and
an expandable energy absorbing device stored within said selectively deployable leg-engaging member, said expandable energy device actuatable upon said system detecting a pedestrian,
wherein the system comprises at least one arm operatively coupled to a portion of a vehicle, the at least one arm operatively coupling the leg-engaging member to the portion of the vehicle, and
wherein the system comprises a pair of spaced-apart arms, each arm operatively coupling the leg-engaging member to an associated portion of the vehicle.

22. An active leg engagement system comprising:
a bumper on a vehicle;
a selectively deployable leg-engaging member separate from said bumper; and
an expandable energy absorbing device stored within said selectively deployable leg-engaging member, said expandable energy device actuatable upon said system detecting a pedestrian,
wherein the system comprises at least one arm operatively coupled to a portion of a vehicle, the at least one arm operatively coupling the leg-engaging member to the portion of the vehicle,
wherein the at least one arm is a telescoping arm in the form of an adjustable stroke piston-and-cylinder arrangement.

23. An active leg engagement system comprising:
a bumper on a vehicle;
a selectively deployable leg-engaging member separate from said bumper;
an expandable energy absorbing device stored within said selectively deployable leg-engaging member, said expandable energy absorbing device actuatable upon said system detecting a pedestrian; and
at least one arm operatively coupled to a portion of a vehicle, the at least one arm operatively coupling the leg-engaging member to the portion of the vehicle for moving the leg-engaging member to a deployed position prior to deployment of the expandable energy absorbing device; and
an adjustable housing structured for attachment to a portion of the vehicle, wherein the at least one arm is operatively coupled to the housing.

\* \* \* \* \*